Oct. 24, 1967     P. D. GEORGE     3,348,438
MODULAR LATHES

Original Filed May 15, 1964     3 Sheets-Sheet 1

INVENTOR
PETER D. GEORGE
BY
ATTORNEYS

INVENTOR
PETER D. GEORGE
BY
ATTORNEYS

Oct. 24, 1967   P. D. GEORGE   3,348,438
MODULAR LATHES

Original Filed May 15, 1964   3 Sheets-Sheet 3

INVENTOR
PETER D. GEORGE
BY
Morse, Altman & Oates
ATTORNEYS

United States Patent Office 3,348,438
Patented Oct. 24, 1967

3,348,438
MODULAR LATHES
Peter D. George, 156 Crabtree Road,
Quincy, Mass. 02169
Original application May 15, 1964, Ser. No. 367,720. Divided and this application Jan. 23, 1967, Ser. No. 611,086
1 Claim. (Cl. 82—23)

ABSTRACT OF THE DISCLOSURE

A lead screw engaging mechanism is provided for selectively connecting and disconnecting a carriage to lead screw. The mechanism includes a pair of half-nuts normally urged apart and out of engagement with the lead screw. A pair of articulated links are eccentrically mounted to a control shaft and to the half-nuts whereby rotation of the control shaft will bring the nuts into engagement with the lead screw. A pivot latch is provided for locking the shaft and the nuts in driving engagement with the lead screw.

---

This application is a division of my U.S. application Ser. No. 367,720, filed May 5, 1964, and now abandoned.

This invention relates generally to lathe machinery and more particularly is directed towards a lathe base support and driving head in cooperation with a variety of interchangeable modules adapted to perform selected machining operations. This invention is also directed towards improvements in lathe components.

A lathe generically defines a machine adapted to remove metal from a workpiece by gripping it securely in a clamping device and rotating it under power against a suitable cutting tool. Lathes are able to perform a number of machining operations such as facing, boring and threading, and, depending upon the design of the machine, these operations may be carried out under manual, semi-automatic or completely automatic control. While machines of this type generally are quite versatile as a class, a specific lathe unit is relatively restricted as to its range of operations. For this reason, machine shops normally require several individual lathe machines, each adapted to perform certain machining operations for which each machine is particularly designed. Since each machine is a relatively expensive piece of equipment, a sizable capital outlay is required to properly outfit a machine shop.

Accordingly, it is a general object of the present invention to provide improvements in lathe machines.

Another object of this invention is to provide a basic lathe unit adapted to accommodate a variety of interchangeable modules for performing a variety of different machining operations.

Still another object of this invention is to provide a lathe machine which is readily convertible from one mode of operation to another.

A still further object of this invention is to provide a lathe machine with cooperating modules which may function on a manual, semi-automatic or completely automatic basis.

More particularly, this invention features a lathe comprising a basic driving head and cylindrical ways of hardened metal on which are selectively mounted interchangeable modules each adapted to perform one or more selected operations such as threading, boring, or the like. Certain ones of the modules may be programmed to cycle automatically and perform selected predetermined operations on a completely automatic basis. Other modules may be employed for semi-automatic operation while further modules may be operated manually for use in producing individual parts not suitable for automatic production.

Figure 1:
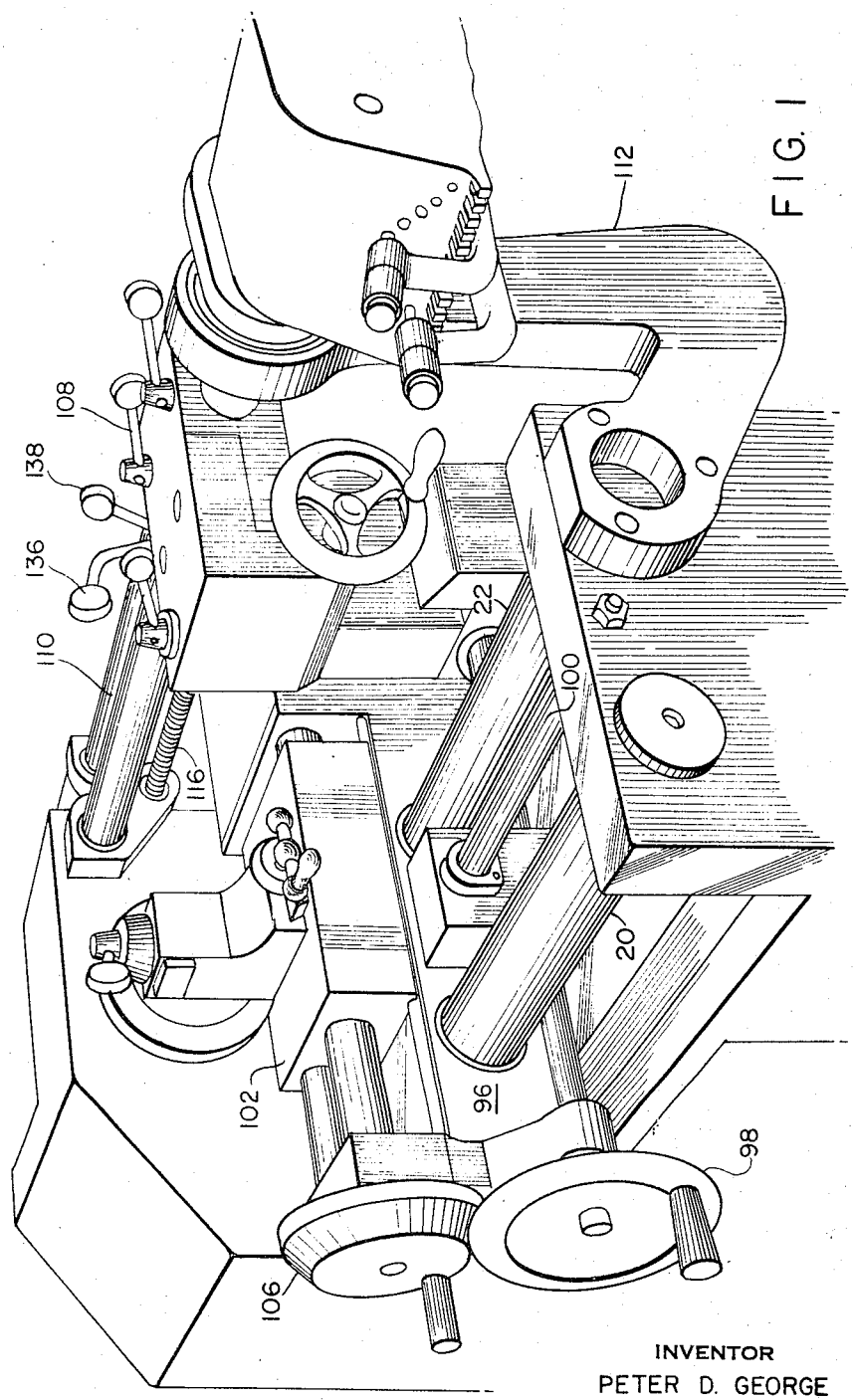
Figure 2:
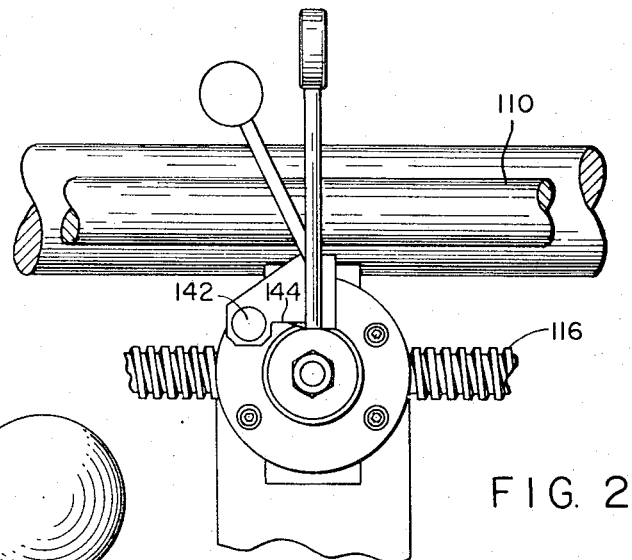
Figure 3:
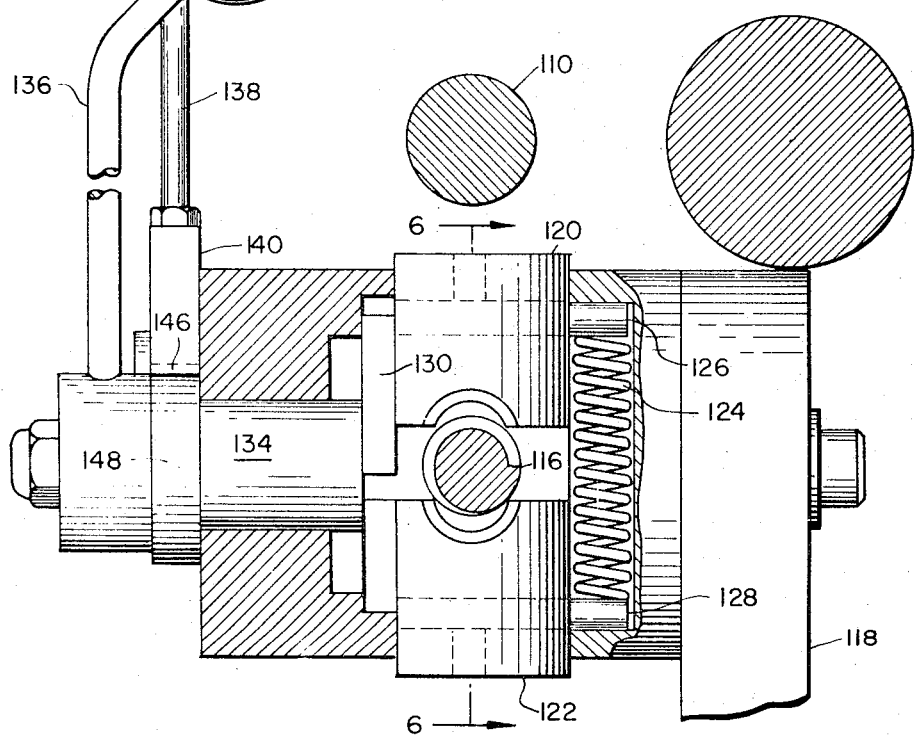
Figure 4:
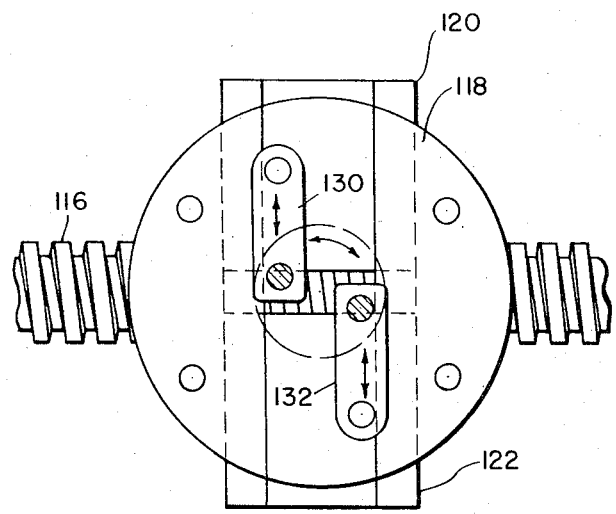
Figure 5:
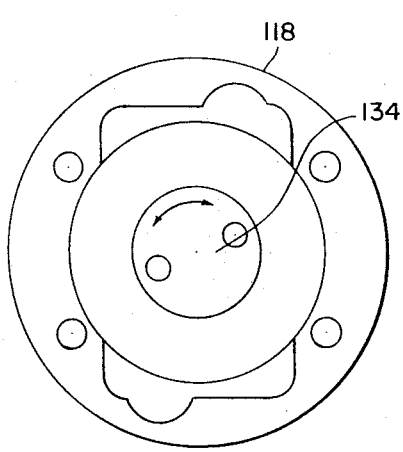
Figure 6:
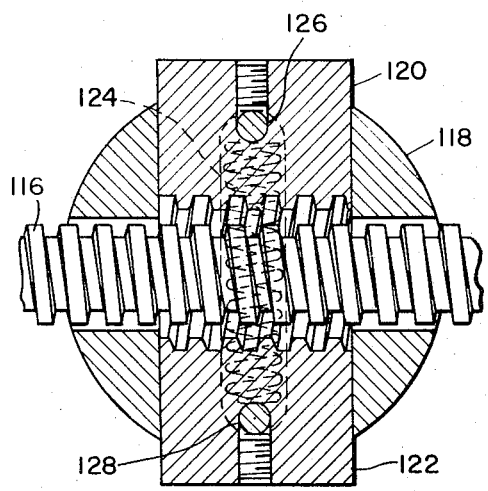

But these and other features of the invention, along with further objects and advantages thereof, will become more fully apparent from the following detailed description of a preferred embodiment of the invention, with reference being made to the accompanying drawings in which:

FIG. 1 is a view in perspective of a precision lathe module set up on a lathe base, FIG. 2 is a fragmentary side elevation of a lead screw engaging mechanism employed in the precision lathe of FIG. 1, FIG. 3 is a fragmentary end elevation partly broken away of the FIG. 2 device, FIG. 4 is a fragmentary side elevation partly in section showing details of the screw engaging mechanism of FIG. 2, FIG. 5 is a side elevation showing further details of the lead screw mechanism of FIG. 2 and, FIG. 6 is a cross-sectional view taken along the line 6—6 of FIG. 3.

Referring now to FIG. 1, there is illustrated a precision lathe using a base support and cylindrical hardened ways. Different modules have been added to the basic unit to provide a lathe adapted to perform the conventional cutting as well as threading. The assembly includes a carriage 96 adapted to be move back and forth along ways 20 and 22 by means of a hand wheel 98 which rotates a pinion (not shown) which in turn meshes with a rack 100 extending parallel between the ways 20 and 22. Mounted on top of the carriage 96 for transverse movement is a slide 102. The slide carries a holder 104 for selected cutting tools. Cross feed of the slide 102 is controlled by a hand wheel 106 which operates a worm in mesh with the slide 102.

A tail stock assembly 108 is supported by ways 110 mounted to the motor housing and to an arm 112. The arm 112 also carries a screw selector 114 which controls the speed of a lead screw 116. The lead screw is adapted to drivingly engage the carriage 96 by means of the engaging mechanism illustrated in FIGS. 2 through 6.

This lead screw engaging mechanism includes a frame 118 fixed to the carriage 96. Mounted within the frame 118 is a pair of half-nuts 120 and 122 disposed to either side of the lead screw and normally urged apart by means of a spring 124 compressed between lugs 126 and 128 extending from the sides of the half-nuts. The half-nuts 120 and 122 which are adapted to move to and away from one another within the frame 118 are also connected to articulated links 130 and 132 eccentrically connected to a stub shaft 134 extending through the frame 118 at right angles to the lead screw 116. The stub shaft may be manually rotated through a limited arc. It will be understood that by pulling the arm 36 forwardly as viewed in FIG. 3, the stub shaft will be rotated and the links 130 and 132 will pull the half-nuts towards one another against the force of the spring 124 so as to engage the half-nuts with the lead screw. The lead screw being engaged to the carriage 96 of FIG. 1 will cause the carriage to be advanced at a speed determined by the speed of the lead screw.

The half-nuts may be locked in a lead screw engaging position by means of an arm 138 and latch 140 best shown in FIGS. 2 and 3. The latch 140 is pivoted about a pin 142 and formed with a shoulder 144 adapted to engage a shoulder 146 formed in a collar 148 integral with the stub shaft 144. It will be understood that when the arm 136 is biased to engage the half-nuts, the latch will drop to engage the shoulder of the stub shaft and thus lock it. The half-nuts may be released by merely lifting the arm 138 to disengage the latch from the shoulder 146.

While the invention has been described with particular reference to the illustrated embodiments, it will be understood that numerous modifications thereto will appear to those skilled in the art. Also, it will be understood that the above description and accompanying drawings should be taken as illustrative of the invention and not in a limiting sense.

Having thus described the invention, what I claim and desire to obtain by Letters Patent of the United States is:

A driving mechanism for lathe modules and the like, comprising
 (a) a lead screw,
 (b) means for rotating said lead screw,
 (c) a support fixed to said module and extending into proximity with said lead screw,
 (d) a pair of half-nuts mounted to said support and disposed on opposite sides of said lead screw,
 (e) spring means normally urging said half-nuts apart and out of engagement with said lead screw,
 (f) a shaft rotatably mounted to said support and perpendicular to said lead screw,
 (g) a lever arm mounted to said shaft,
 (h) a pair of links each connected at one end eccentrically to said shaft and at the other end to said half-nuts and adapted to pull said half-nuts into driving engagement with said lead screw upon rotation of said arm,
 (i) locking means mounted on said support for locking said half-nuts in an engaged position,
 (j) said locking means including a shoulder formed on said shaft and a latch pivoted to said support about an axis parallel to said shaft and adapted to engage said shoulder when said half-nuts are in an engaged position, and,
 (k) another lever arm mounted to said latch for moving said latch into and out of shoulder engaging position.

References Cited
UNITED STATES PATENTS

| | | | |
|---|---|---|---|
| 964,752 | 7/1910 | Cartwright | 82—23 X |
| 1,548,576 | 8/1925 | Bachtel | 82—23 X |
| 2,865,241 | 12/1958 | Farrow | 82—23 |
| 3,188,897 | 6/1965 | De Valliere | 82—23 |

LEONIDAS VLACHOS, *Primary Examiner.*